Feb. 6, 1934.  W. N. (TAMPTON) AUBUCHON, JR  1,945,721
METHOD OF AND APPARATUS FOR PRODUCING MOTION PICTURES
Filed July 25, 1931  2 Sheets-Sheet 1
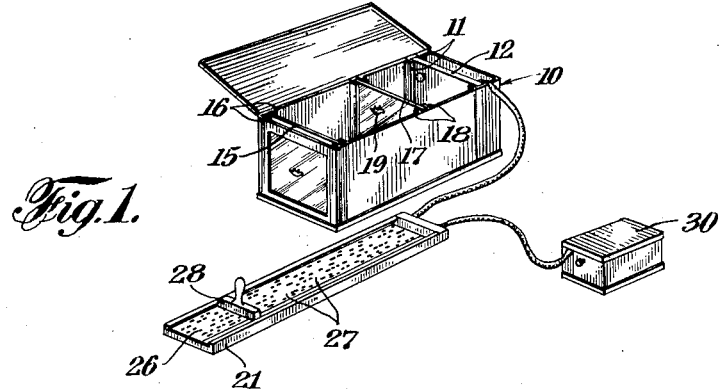
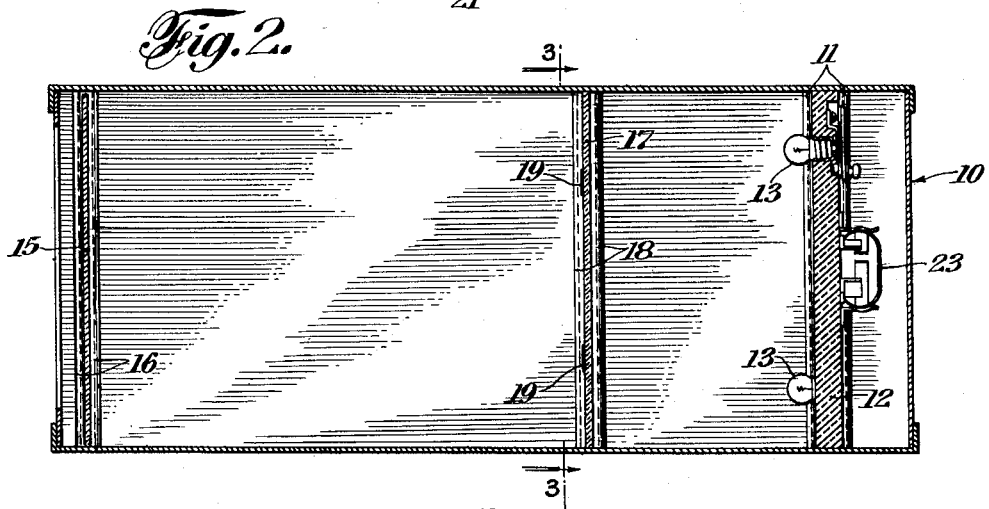
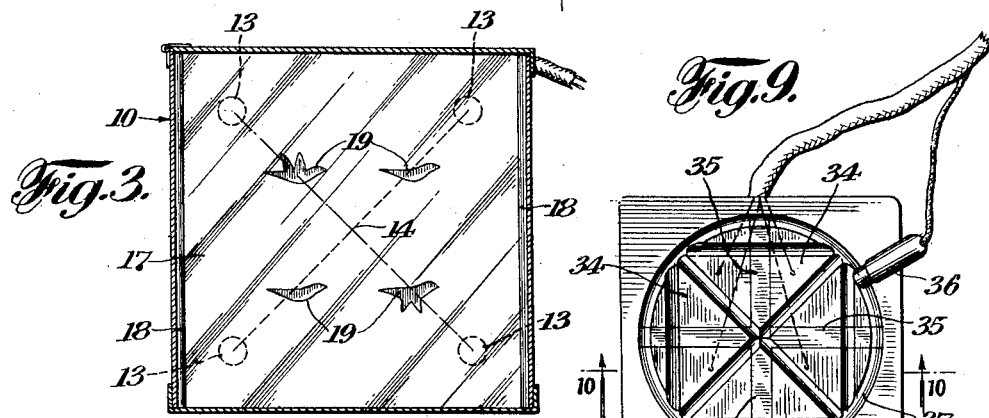
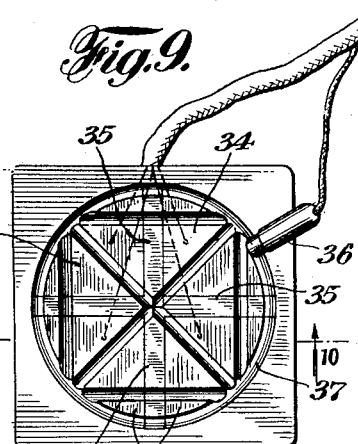
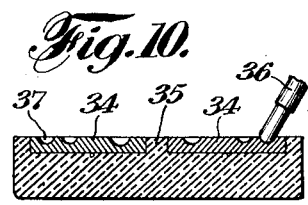
INVENTOR
William N. (Tampton) Aubuchon, Jr.
BY
Prindle Bean & Mann
ATTORNEY Feb. 6, 1934.   W. N. (TAMPTON) AUBUCHON, JR   1,945,721
METHOD OF AND APPARATUS FOR PRODUCING MOTION PICTURES
Filed July 25, 1931   2 Sheets-Sheet 2
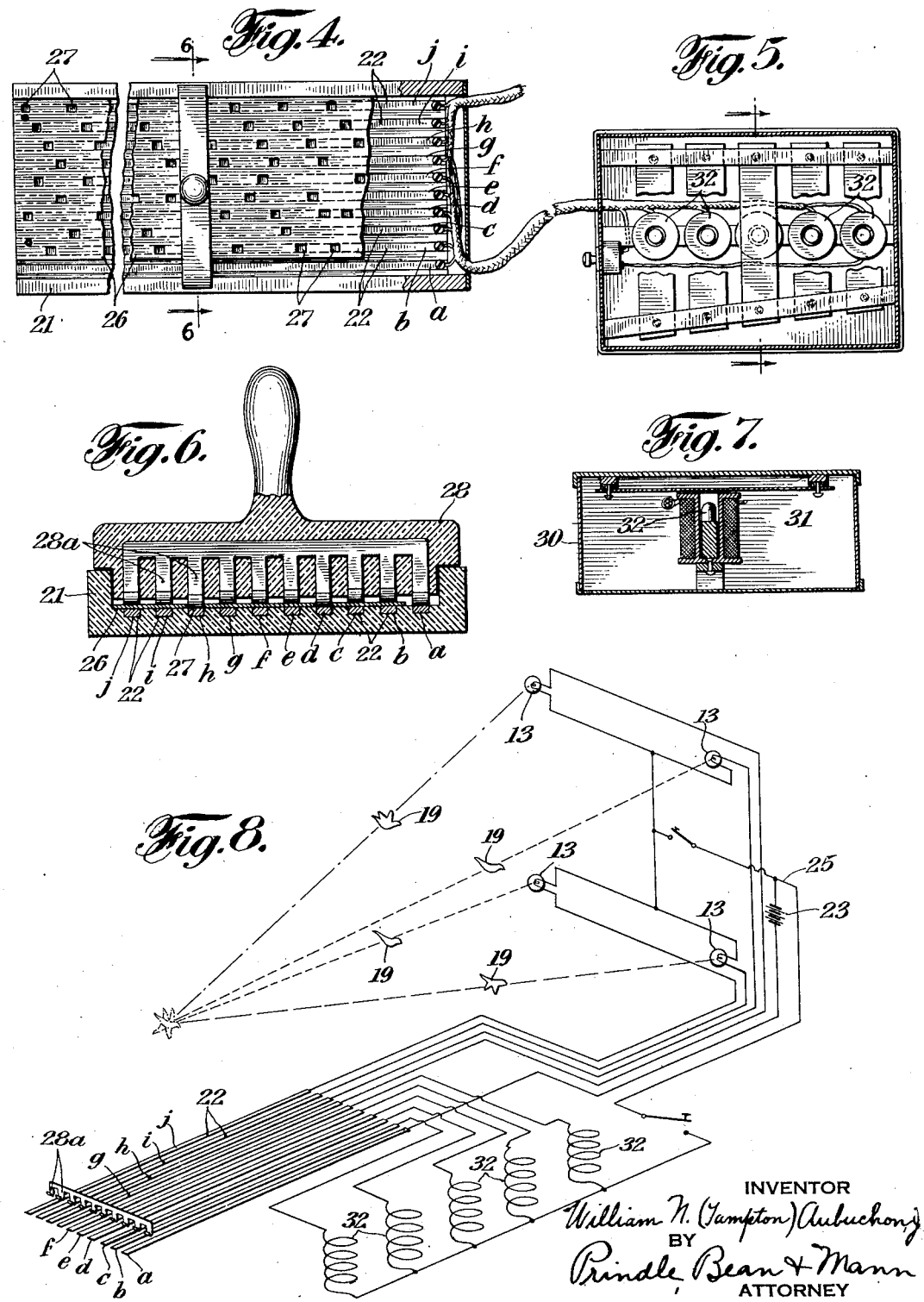

Patented Feb. 6, 1934

1,945,721

UNITED STATES PATENT OFFICE 1,945,721

METHOD OF AND APPARATUS FOR PRODUCING MOTION PICTURES

William N. (Tampton) Aubuchon, Jr., New York, N. Y.

Application July 25, 1931. Serial No. 553,127

37 Claims. (Cl. 40—132)

The object of my invention has been to provide a method of and apparatus for producing the combined effect of motion pictures and of music to accompany the same, which shall have the advantage, both as to the producing of motion pictures and of music, of being extremely simple, and of being susceptible of satisfactory operation and control by children. While I shall illustrate my invention, both as to the method and as to the apparatus, by describing the best form of apparatus and the best method which are at present known to me, my invention both as to the production of motion picture effects, and of music and of the combination of the two, is capable of embodiment in many different forms and ways, and my invention is not to be confined to the forms by which it is illustrated.

In the accompanying drawings, Fig. 1 is a perspective view of one embodiment of my complete apparatus for producing both motion picture effects and music appropriate thereto.

Fig. 2 is a vertical, longitudinal section of the motion picture unit shown in perspective of Fig. 1.

Fig. 3 is a transverse sectional view taken on the line 3—3 of Fig. 2 and working in the direction of the arrows.

Fig. 4 is a broken plan view of the commutator device for operating the lamps of the motion picture device and the solenoids of the musical producing instrument.

Fig. 5 is a broken plan view of the musical producing device.

Fig. 6 is a transverse sectional view of Fig. 4 taken on the line 6—6 and showing the brush for making contacts on the commutator board for operating the motion picture and music producing devices.

Fig. 7 is a transverse sectional view taken on the line 7—7 of Fig. 5.

Fig. 8 is a diagrammatic view showing the relation of the lamps and the figures whose shadows are to form the motion picture effect.

Fig. 9 is a plan view of a simplified form of commutator by which the electric light bulbs can be lighted by the use of a contact point either in continuous succession, or in a variety of selected ways, and Fig. 10 is a sectional view taken on the line 10—10 of Fig. 9.

Referring first to the portion of the apparatus for producing the motion picture effect; I have provided a box 10 which, in the present instance has vertical guides or grooves 11, in which is mounted a support 12 having mounted thereon a series of electric light bulbs 13 which, in the present instance, are equally distant from a common center 14 and, in the present instance, are at equal angular distances from each other measured from said center. Near the front of the box a translucent screen 15 is mounted, in the present instance in a pair of guides 16, while, at an intermediate point between the support 12 and the screen, a support 17 is mounted in a pair of guides 18 for figures 19, consisting of shadow or translucent pictures of figures which are to be thrown upon the screen. In the present instance, the support 17 is a sheet of glass. Each of the said figures 19, in the present instance, is so related to one of the electric light bulbs that, in the practice of my method, its shadow or colored picture will fall upon the center of the screen, and that the shadows of the stationary parts of the figures would be superimposed, if all the lights were lighted at the same time. In this manner, the illusion is produced of a single figure successively moving through different attitudes; and, in the case of a human being, animal or bird, producing an illusion of life.

It will be seen that by providing means for lighting the electric bulbs one at a time, shadows of the figures can be thrown upon the screen without any other moving part than the contact which controls the said lighting.

A form of apparatus by which the successive lighting of the various electric light bulbs may be accomplished is as follows:

In or on a block 21 are located a series of parallel metal strips 22 *a, b, c, d, e, f, g, h, i, j*, which are preferably sunk flush with the surface of the said block. A battery 23 has one pole connected by a wire to a binding post on the strip 22*a*, while each of the strips 22 *g, h, i, j*, is connected by wires with the incoming lead of one of the electric light bulbs, the outgoing leads being connected with a return wire 25 to the other pole of the battery. A sheet or strip of paper 26 is laid upon the block 21 to protect said strips from unintentional electric contacts, and holes 27 are formed in the said paper to expose the said strips to such contacts at desired intervals and in a predetermined order. Electric current is conveyed from the strip 22*a*, which is contacted with a pole of the battery, to one or other of the strips *g, h, i, j*, by a brush 28 having yielding points 28*a*, which are so spaced as to contact with one or other of the said strips, as the said brush is moved along said strip of paper over the said metal strips. By properly positioning the openings in the paper, the electric bulbs can be lighted in any desired order and at any predetermined sequence. As each bulb lights, it will throw a shadow or image of its corresponding figure on the screen, and, by moving the said brush rapidly enough, the effect of fairly continuous movement can be produced.

In order to provide the music, either to accompany the motion of the figures, or to be heard alone, I provide a series of electrically operable music devices. For illustration, I have depicted a box 30 series of resonant or musical bars 31 of graduated length, which are loosely supported at their ends upon felt covered supports. In order to cause the said bars to give out a musical note, I have, in the present instance, provided an electrically conductive coil 31, within which is a ball 32 of magnetic metal. I have also connected one end of each coil to one of the bars 22 $b$, $c$, $d$, $e$, or $f$, and have connected the other end of said coil to the return wire 25 leading to the battery. I have provided openings 27 in the said sheet of paper over the said metallic strips 22 $b$, $c$, $d$, $e$ and $f$, so that, when the brush is moved over the paper with its teeth over and aligned with the metal strips, not only will a motion picture be produced, but appropriate music will accompany it.

The application of the principles illustrated in the embodiment of my invention which has just been described, may be varied in different ways. For instance, the electric light bulbs may be arranged in other ways than at equal radial distances. For instance, the spot at which the moving figure is located on the screen need not be in the center, but may be varied. By properly selecting the relative positions of the images and the electric light bulbs, the figure may be made to move across the screen. An object may be made to appear and disappear suddenly or for only a short interval. Instead of using a separate light bulb for each representation of the object, the same effect could be obtained by using a single light bulb and successively so positioning and lighting it behind the several representations of the object as to cause their shadows to show at the same place upon the screen and thus to combine to reduce the illusion of more or less continuous motion. In this form of my invention, the representations or images would be stationary, and the motion picture effect obtained by moving the light, which is the reverse of the method by which motion pictures are produced at the present day.

By connecting the wires from the electric light bulbs to one or another of the conductive strips 22 $g$, $h$, $i$, $j$, or by disconnecting some of the said wires, the figures may be shown selectively, or in any desired sequence.

Either the motion pictures or the music can be produced separately; and, if desired, the parts of the apparatus for producing such effects can be disconnected and used entirely independently of each other.

In Figs. 9 and 10, I have shown a form of commutator, by which the motion picture effect can be continuously produced for any desired length of time without interruption. The said commutator consists of a series of wedge-shaped commutator blocks 34 which are insulated from each other by strips 35, and each of which has a connection for a wire to an electric light bulb, the opposite electrode of the electric light bulbs being connected to a battery. A metallic contact point 36 is connected by a loose flexible wire to the opposite pole of the battery from that to which the electric light bulbs are connected; and, in operation, the said point is contacted with each of the commutator blocks in any desired order. For rapid and smooth performance of said contacting operation, I prefer to provide a circular groove 37 in the said contact blocks, so that the said point can readily and rapidly be made to contact with each of the said blocks by causing it to travel around the said groove.

My apparatus is of extreme simplicity. It can be made with no moving parts except the single part by which contacts are made. The motion picture effect is produced without the use of a lens and without the use of a shutter. No moving film is required.

The portion of my machine by which the motion picture figures are producible can be varied so as to select certain figures and exclude others, or so that the motions of the figures can, if desired, be reversed. While I have described my invention in an extremely simple form, its convenience could be somewhat increased at only slight additional complexity. The form of my commutator device, which is shown in Fig. 4 can be used to produce either the motion picture effect, or the music separately, if desired. By substituting letters of the alphabet for representations of attitudes of an object, said letters can be caused successively to appear at the same spot on a screen and thus to spell a word or make an announcement without any other moving parts than a contact for commutator plates.

In the claims, the term "electric bulb" is used, but it is to be understood as meaning any fairly small or point-like source of electric or other light which will give the same effect. Also the term "shadow", as used in the claims is intended to include not only the usual black silhouette shadow, but the color effect which would be produced when a translucent image is used, and particularly a translucent colored image, and it is also to be understood as including an image produced by light on a relatively dark background.

By the term "light bulb" in the claims, it is intended to include any relatively concentrated source of light, which will throw the desired shadow on the screen.

I claim:

1. The combination of a plurality of light bulbs, a support for a series of representations of an object whose motion it is desired to show, and a screen on the opposite side of said representations from said light bulbs, each of said bulbs and a corresponding representation being so arranged that the shadows of said representations of said object, when thrown upon said screen by the successive lighting of a plurality of said bulbs, shall give the appearance of more or less continuous motion of said object.

2. The combination of a plurality of light bulbs, a support for a series of representations of an object whose motions it is desired to show, and a screen on the opposite side of said representations from said light bulbs, each of said bulbs and a corresponding representation being so arranged that the shadows of said representations of said object, when thrown upon said screen by the successive lighting of a plurality of said bulbs, shall give the appearance of more or less continuous motion of said object, and means for successively lighting said bulbs.

3. A motion picture device comprising the combination of a number of electric light bulbs, a number of representations of an object to be depicted, a screen upon which the shadows of such representations may be projected and means for successively lighting said bulbs, said bulbs, representations and screen being so positioned that such successive lighting shall cause said shadows to depict motion of an object.

4. The combination of a plurality of light bulbs, a series of representations of an object whose motion it is desired to show, a screen on the opposite side of said representations from said light bulbs, each of said bulbs and a corresponding representation being so arranged that the shadows of said representations of said object, when thrown upon the said screen by the successive lighting of a plurality of said bulbs, shall give the appearance of more or less continuous motion of said object and means for successively lighting said bulbs comprising a plurality of commutator plates arranged substantially in a plane, each of said plates being connected with one of said bulbs, a source of current, and a manually moveable contact connected with said source.

5. The combination of a plurality of light bulbs, a series of representations of an object whose motion it is desired to show, a screen on the opposite side of said representations from said light bulbs, each of said bulbs and a corresponding representation of said object being so arranged that the shadows of said representations when thrown upon the said screen by the successive lighting of a plurality of said bulbs, shall give the appearance of more or less continuous motion of said object, and means for successively lighting said bulbs comprising a plurality of commutator plates arranged substantially in a plane, each of said plates being connected with one of said bulbs, a source of current, and a manually moveable contact connected with said battery, said contact being substantially pointed, and said commutator plates having grooves therein for guiding said pointer's contact with said plates in a predetermined order.

6. The combination of a plurality of light bulbs, a series of representations of an object whose motion it is desired to show, a screen on the opposite side of said representations from said light bulbs, each of said bulbs and a corresponding representation of said object being so arranged that the shadows of said representations when thrown upon the said screen by the successive lighting of a plurality of said bulbs, shall give the appearance of more or less continuous motion of said object, and means for successively lighting said bulbs comprising a plurality of commutator plates arranged substantially in a plane, each of said plates being connected with one of said bulbs, a source of current, and a manually moveable contact connected with said battery, said contact being substantially pointed and said commutator plates having an annular groove therein for guiding said pointer's contact with said plates in a predetermined order.

7. A motion picture device comprising the combination of a number of representations of objects to be depicted, a corresponding number of electric light bulbs, a number of representations of objects to be depicted in sequential attitudes, a screen upon which the shadows of such representations may be projected and means for successively lighting said bulbs, said bulbs, objects, and screen being so positioned that such successive lighting shall cause said shadows to appear substantially in the same location on the screen.

8. The method of producing motion picture effects consisting in providing a series of stationary representations, in different attitudes, of an object whose motion it is desired to show, and successively throwing shadows of said representations on a screen by illuminating light bulbs, behind each representation in such a position that the shadows of said representations shall be so related as to give the appearance of more or less continuous motion of said object.

9. The method of producing motion picture effects consisting in providing a series of stationary representations in different attitudes, of an object whose motion it is desired to show, so locating a light bulb behind each of said representations, that their shadows when thrown upon a screen shall have such relationship as to give the appearance of more or less continuous motion of an object, and successively lighting said bulbs in the proper order to produce the said effect.

10. The method of producing motion picture effects consisting in providing a series of stationary representations, in different attitudes, of an object whose motion it is desired to show, and causing the shadows of said representations to properly assemble on a screen by suitably positioning and lighting light bulbs relative to each representation in succession.

11. The method of producing motion picture effects consisting in providing a series of stationary representations, in different attitudes, of an object whose motion it is desired to show, and causing the shadows of said representations to properly assemble on a screen by suitably positioning a light bulb relative to each representation, and successively illuminating said light bulbs.

12. The method of producing motion picture effects consisting in providing a series of stationary representations of objects in different attitudes and causing the shadows of said representations to appear substantially in the same place on a screen by lighting each representation from a position which will cause its shadow to fall upon said place.

13. The combination of a plurality of light bulbs, a support for a series of representations of an object in different attitudes whose motion it is desired to depict, and a screen on the opposite side of said representations from said light bulbs, each of said bulbs and its corresponding representation being so arranged that the shadows of said representations of said object shall be sufficiently closely related so that when thrown upon said screen by the successive lighting of a plurality of said bulbs, they shall give the appearance of more or less continuous motion of said object.

14. The combination of a plurality of light bulbs, a support for a series of representations of an object in different attitudes whose motion it is desired to depict, and a screen on the opposite side of said representations from said light bulbs, each of said bulbs and its corresponding representation being so arranged that the shadows of said representations of said object shall so overlap that when thrown upon said screen by the successive lighting of a plurality of said bulbs, they shall give the appearance of more or less continuous motion of said object.

15. The combination of a plurality of light bulbs, a support for a series of representations of an object in different attitudes whose motions it is desired to show, and a screen on the opposite side of said representations from said light bulbs, each of said bulbs and its corresponding representation being so arranged that the shadows of said representations of said object shall be so related that when thrown upon the said screen by the successive lighting of a plurality of said bulbs, they shall give the appearance of more or less continuous motion of said object, and means for successively lighting said bulbs.

16. A motion picture device comprising the combination of a number of electric light bulbs, a number of representations of an object in different attitudes to be depicted, a screen upon which the shadows of such representations may be projected and means for successively lighting said bulbs, said bulbs, representations and screen being so positioned that such successive lighting shall cause said shadows to depict motion of a single object.

17. A motion picture device comprising the combination of a number of electric light bulbs, a number of representations of an object in different attitudes to be depicted, a screen upon which the shadows of such representations may be projected and means for successively lighting said bulbs, said last mentioned bulbs, their corresponding representations, and said screen being so positioned that such successive lighting shall cause said shadows to depict more or less continuous motion of an object.

18. The combination of a plurality of light bulbs, a series of representations of an object in different attitudes whose motion it is desired to show, a screen on the opposite side of said representations from said light bulbs, each of said bulbs and a corresponding representation being so arranged that the shadows of said representations of said object, when thrown upon the said screen by the successive lighting of a plurality of said bulbs, shall give the appearance of more or less continuous motion of said object, and means for successively lighting said bulbs comprising contacts for each of said bulbs and manually operable means for closing the said contacts.

19. A motion picture device comprising the combination of a number of representations in different attitudes of objects to be depicted, a corresponding number of electric light bulbs, a screen upon which the shadows of such representations may be projected and means for successively lighting said bulbs, said bulbs, objects, and screen being so positioned that such successive lighting shall cause said shadows to appear in closely related positions on the screen.

20. In a motion picture projecting apparatus the combination of a screen, a plurality of images, means for successively throwing light through said images to projecting shadows thereof on said screen, said means for throwing light being so constructed that there shall be no intermission between the throwing of light through adjacent images.

21. The combination of a plurality of light bulbs, a support for a series of representations of an object whose motion it is desired to show, and a screen on the opposite side of said representations from said light bulbs, each of said bulbs and a corresponding representation being so arranged that the shadows of said representations of said object, when thrown upon said screen by the successive lighting of a plurality of said bulbs, may be made successively to blend one into another so as to give the appearance of more or less continuous motion of said object.

22. The combination of a plurality of light bulbs, a support for a series of representations of an object whose motions it is desired to show, and a screen on the opposite side of said representations from said light bulbs, each of said bulbs and a corresponding representation being so arranged that the shadows of said representations of said object, when thrown upon said screen by the successive lighting of a plurality of said bulbs, may be made successively to blend one into another so as to give the appearance of more or less continuous motion of said object, and means for successively lighting said bulbs.

23. The combination of a screen, a series of stationary lamps, a film having a plurality of figures thereon, said lamps being so placed as to throw images of said figures on said screen, commutator pieces connected with said lamps, and manually operable means for conveying current to said commutator pieces in various orders, to produce different motion picture effects at will.

24. The combination of a screen, a series of stationary lamps, a film having a plurality of figures thereon, said lamps being so placed as to throw images of said figures on said screen, commutator pieces connected with said lamps, and manually operable means for conveying current to said commutator pieces in various orders, to produce different motion picture effects at will, said commutator pieces having a track for guiding said manually operable means.

25. The combination of a screen, a series of stationary lamps, a film having a plurality of figures thereon, said lamps being so placed as to throw images of said figures on said screen, commutator pieces connected with said lamps, and manually operable means for conveying current to said commutator pieces in various orders, to produce different motion picture effects at will, said commutator pieces having a plurality of tracks for guiding said manually operable means.

26. The combination of a screen, a series of stationary lamps, a film having a plurality of figures thereon, said lamp being so placed as to throw images of said figures on said screen, commutator pieces connected with said lamps, and manually operable means for conveying current to said commutator pieces in various orders, to produce different motion picture effects at will, said commutator pieces having a plurality of tracks for guiding said manually operable means.

27. The combination of a screen, a series of stationary lamps, a film having a plurality of figures thereon, said lamps being so placed as to throw images of said figures on said screen, commutator pieces connected with said lamps, and manually operable means for conveying current to said commutator pieces in various orders, to produce different motion picture effects at will, said commutator pieces having a plurality of tracks for guiding said manually operable means, and a plurality of tracks so connected that said manually operable means may readily be switched from one to another of said tracks.

28. The combination of a screen, a series of stationary lamps, a film having a plurality of figures thereon, said lamps being so placed as to throw images of said figures on said screen, commutator pieces connected with said lamps, and manually operable means for conveying current to said commutator pieces in various orders, to produce different motion picture effects at will, said commutator pieces having a plurality of tracks for guiding said manually operable means, said tracks being so connected that said manually operable means without pause may readily be switched from one to another of said tracks.

29. The combination of a screen, a plurality of stationary lamps, a film having a plurality of figures thereon, said lamps being so placed as to throw images of said figures on said screen, commutator pieces connected with said lamps, and manually operable means for conveying current to said commutator pieces in various orders, to produce different motion picture effects at will.

30. The combination of a screen, a series of stationary lamps, a film having a plurality of figures thereon, said lamps being so placed as to throw images of said figures on said screen, one image for each lamp, commutator pieces connected with said lamps, and manually operable means for conveying current to said commutator pieces in various orders, to produce different motion picture effects at will.

31. The combination of a screen, a series of stationary lamps, a stationary film having a plurality of figures thereon, said lamps being so placed as to throw images of said figures on said screen, one image for each lamp, commutator pieces connected with said lamps, and manually operable means for conveying current to said commutator pieces in various orders, to produce different motion picture effects at will.

32. The combination of a screen, a series of stationary lamps, a stationary film having a plurality of figures thereon, said lamps and figures being so placed as to throw images of said figures at approximately the same place on said screen, one image for each lamp, and a commutator so connected with said lamps as to be capable of operating them successively.

33. The combination of a screen, a series of stationary lamps, a stationary film having a plurality of figures thereon, said lamps and figures being so placed as to throw images of said figures at approximately the same place on said screen, one image for each lamp, and a commutator so connected with said lamps as to be capable of operating them successively, and means for simultaneously dimming one lamp while increasingly lighting the next lamp.

34. The combination of a screen, a series of stationary lamps, a stationary film having a series of figures thereon, said lamps and figures being so placed as to so throw images of said figures on said screen as to simulate substantially continuous motion, and commutator pieces connected with said lamps.

35. The combination of a screen, a series of stationary lamps, a stationary film having a series of figures thereon, said lamps and figures being so placed as to so throw images of said figures on said screen as to simulate substantially continuous motion, and commutator pieces connected with said lamps, and manually operable means for conveying current to said commutator pieces in various orders to produce different motion picture effects at will.

36. The combination of a screen, a series of stationary lamps, a stationary film having a plurality of figures thereon, said lamps being so placed as to throw images of said figures on said screen, one image for each lamp, means for preventing the light of each lamp from projecting shadow of any other than its own figure, and means for lighting said lamps successively.

37. The combination of a screen, a series of stationary lamps, a stationary film having a plurality of figures thereon, said lamps being so placed as to throw images of said figures on said screen, one image for each lamp, means for preventing the light of each lamp from projecting a shadow of any other than its own figure, and manually operable means for lighting said lamps successively.

WILLIAM N. (TAMPTON) AUBUCHON, Jr.